US010780822B1

(12) United States Patent
Salter et al.

(10) Patent No.: US 10,780,822 B1
(45) Date of Patent: Sep. 22, 2020

(54) VEHICLE EXCLUSION ZONE MONITORING ASSEMBLY AND METHOD

(71) Applicant: Ford Global Technologies, LLC, Dearborn, MI (US)

(72) Inventors: Stuart C. Salter, White Lake, MI (US); Paul Kenneth Dellock, Northville, MI (US); Venkatesh Krishnan, Canton, MI (US); Mark Bosca, St. Clair Shores, MI (US); Ashley Lucas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/416,446

(22) Filed: May 20, 2019

(51) Int. Cl.
*B60Q 1/50* (2006.01)
*B60Q 1/00* (2006.01)
*B60Q 1/26* (2006.01)
*G06K 9/00* (2006.01)

(52) U.S. Cl.
CPC ............ *B60Q 1/50* (2013.01); *B60Q 1/0023* (2013.01); *B60Q 1/2607* (2013.01); *B60Q 1/2611* (2013.01); *G06K 9/00221* (2013.01); *B60Q 2400/50* (2013.01)

(58) Field of Classification Search
None
See application file for complete search history.

(56) References Cited

U.S. PATENT DOCUMENTS

| | | | | |
|---|---|---|---|---|
| 4,916,296 A * | 4/1990 | Streck | ................. | G06K 7/1097 235/454 |
| 5,249,501 A * | 10/1993 | Waldman | ................. | F41G 3/145 356/141.1 |
| 5,319,350 A * | 6/1994 | DeMarco | ............ | B60R 25/1004 340/426.22 |
| 5,729,016 A * | 3/1998 | Klapper | .................... | B60R 1/00 250/332 |
| 5,905,434 A * | 5/1999 | Steffan | .................... | B60Q 1/50 116/28 R |
| 7,411,175 B2 | 8/2008 | Schwartz | | |
| 8,690,365 B1 * | 4/2014 | Williams | ................. | B60R 1/06 359/850 |
| 9,369,680 B2 | 6/2016 | Teller et al. | | |
| 9,376,051 B1 * | 6/2016 | McKenna | ........ | G08G 1/096716 |
| 9,437,111 B2 | 9/2016 | Ignaczak et al. | | |

(Continued)

OTHER PUBLICATIONS

Goldberg, Max, Dodges New Charger Police Cars Use Cameras and Radar to Protect Officers from Threats, The Drive, Feb. 9, 2017, retrieved from https://www.thedrive.com/emergency/7516/dodges-new-charger-police-cars-use-cameras-and-radar-to-protect-officers-from-threats on Apr. 4, 2019.

*Primary Examiner* — Curtis J King
(74) *Attorney, Agent, or Firm* — David Coppiellie, Esq.; Carlson, Gaskey & Olds, P.C.

(57) ABSTRACT

A vehicle assembly includes, among other things, an emitter system of a vehicle, a sensor system of the vehicle, and at least one lighting device of the vehicle. The emitter system is configured to project a marker to provide a visual representation of an exclusion zone adjacent the vehicle. The sensor system is configured to detect a position of an individual relative to the exclusion zone. The vehicle configured to redirect light from the at least one lighting device based on the position of the individual relative to the exclusion zone.

20 Claims, 4 Drawing Sheets

(56) References Cited

U.S. PATENT DOCUMENTS

| | | | | |
|---|---|---|---|---|
| 9,567,102 | B1* | 2/2017 | Ross | B64D 45/00 |
| 9,645,226 | B2* | 5/2017 | Scott | B63B 45/00 |
| 10,308,330 | B1* | 6/2019 | Spivak | F21V 21/15 |
| 2006/0007001 | A1* | 1/2006 | Rastegar | G01S 5/02 340/552 |
| 2007/0053195 | A1* | 3/2007 | Alberti | B60Q 1/2665 362/494 |
| 2008/0150791 | A1* | 6/2008 | Robertson | B63B 45/02 342/147 |
| 2010/0194556 | A1* | 8/2010 | LaRosa | B60Q 1/2611 340/471 |
| 2011/0285519 | A1* | 11/2011 | Scheuermann | B60Q 1/50 340/425.5 |
| 2011/1028551 | | 11/2011 | Scheurmann | |
| 2015/0035437 | A1* | 2/2015 | Panopoulos | H05B 47/105 315/112 |
| 2017/0136941 | A1* | 5/2017 | Hausler | B62D 25/04 |
| 2017/0341571 | A1* | 11/2017 | Salter | B60Q 1/2619 |
| 2017/0368984 | A1* | 12/2017 | Salter | F21V 23/0435 |
| 2018/0147980 | A1* | 5/2018 | Blask | B60Q 1/2696 |
| 2019/0077306 | A1* | 3/2019 | Duncan | B60Q 1/245 |
| 2019/0368702 | A1* | 12/2019 | Sousa | F21S 41/657 |
| 2020/0039421 | A1* | 2/2020 | Grone | B60Q 1/50 |

\* cited by examiner

VEHICLE EXCLUSION ZONE MONITORING ASSEMBLY AND METHOD

TECHNICAL FIELD

This disclosure relates generally to detecting an individual near a vehicle.

BACKGROUND

An individual may approach a vehicle. For example, a stationary law enforcement vehicle could be approached by one or more individuals.

SUMMARY

A vehicle assembly according to an exemplary aspect of the present disclosure includes, among other things, an emitter system of a vehicle, a sensor system of the vehicle, and at least one lighting device of the vehicle. The emitter system is configured to project a marker to provide a visual representation of an exclusion zone adjacent the vehicle. The sensor system is configured to detect a position of an individual relative to the exclusion zone. The vehicle is configured to redirect light from the at least one lighting device based on the position of the individual relative to the exclusion zone.

In another example of the foregoing assembly, the vehicle is configured to redirect light from the at least one lighting device into a face of the individual based on the position of the individual relative to the exclusion zone.

In another example of any of the foregoing assemblies, the vehicle is configured to redirect light from the at least one lighting device in response to the individual entering the exclusion zone.

In another example of any of the foregoing assemblies, the emitter system comprises a laser projector and the marker is provided by at least one laser beam emitted from the laser projector.

In another example of any of the foregoing assemblies, the at least one lighting device comprises a spotlight.

In another example of any of the foregoing assemblies, the sensor system is configured to capture details that can identify the individual.

In another example of any of the foregoing assemblies, the sensor system comprises a facial recognition camera.

In another example of any of the foregoing assemblies, the sensor system comprises a stereo camera.

Another example of any of the foregoing assemblies includes a speaker of the vehicle. The speaker is configured to broadcast identification details about the individual based on the position of the individual relative to the exclusion zone.

In another example of any of the foregoing assemblies, the identification details include a name of the individual.

A monitoring method according to another exemplary aspect of the present disclosure includes, among other things, projecting a marker from an emitter system of a vehicle. The marker provides a visual representation of an exclusion zone adjacent the vehicle. The method further includes detecting a position of an individual relative to the exclusion zone, and redirecting light from at least one lighting device on the vehicle. The redirecting is based on the position of the individual relative to the exclusion zone.

In another example of the foregoing method, the redirecting includes redirecting light from the at least one lighting device into a face of the individual when the individual is within the exclusion zone.

Another example of any of the foregoing methods includes automatically capturing details about the individual when the individual is in the exclusion zone and using the details to identify the individual.

Another example of any of the foregoing methods includes audibly broadcasting an identity of the individual when the individual is in the exclusion zone.

In another example of any of the foregoing methods, the individual is a first individual. The method further includes automatically capturing details about a second individual that is outside the exclusion zone and using the details to identify the second individual.

In another example of any of the foregoing methods, the projecting includes emitting a laser from a laser projector of the vehicle.

In another example of any of the foregoing methods, redirecting light from at least one lighting device on the vehicle includes redirecting the laser from the laser projector.

In another example of any of the foregoing methods, the redirecting light from at least one lighting device on the vehicle includes flashing the light from the lighting device on and off.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to providing a visual representation of an exclusion zone adjacent a vehicle, and detecting a position of an individual relative to the exclusion zone.

Figure 1:
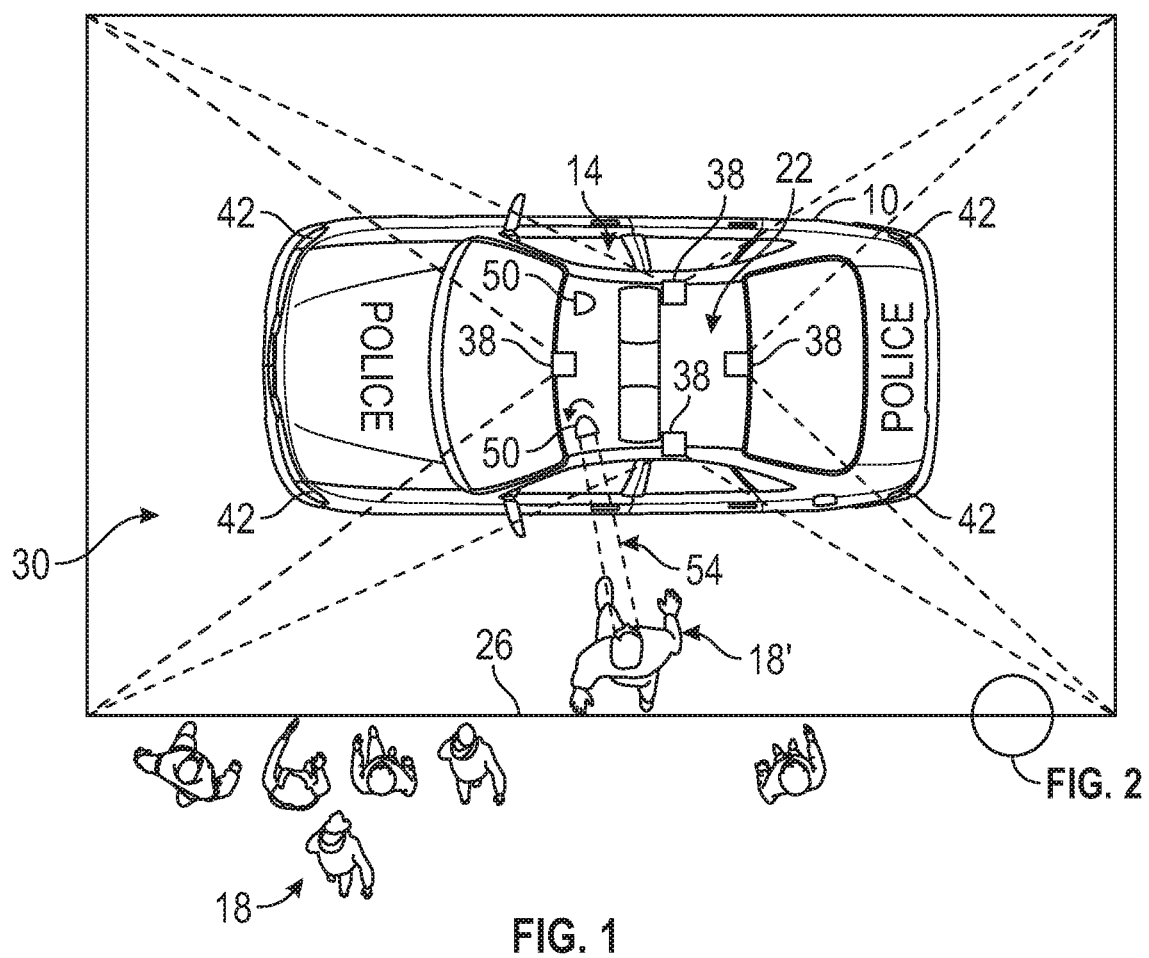
FIG. 1 illustrates a top view of an exemplary vehicle that provides and monitors an exclusion zone.
Figure 2:
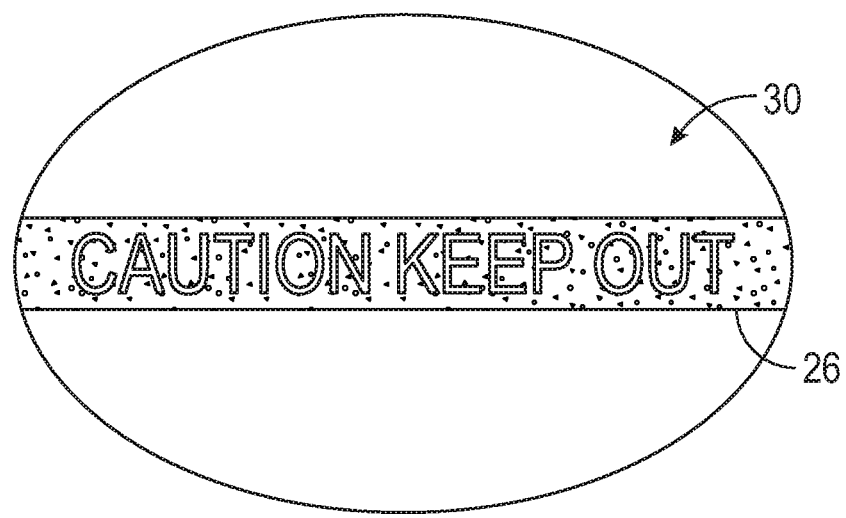
FIG. 2 illustrates a close-up view of portion of a marker emitted from the vehicle of FIG. 1.
Figure 3:
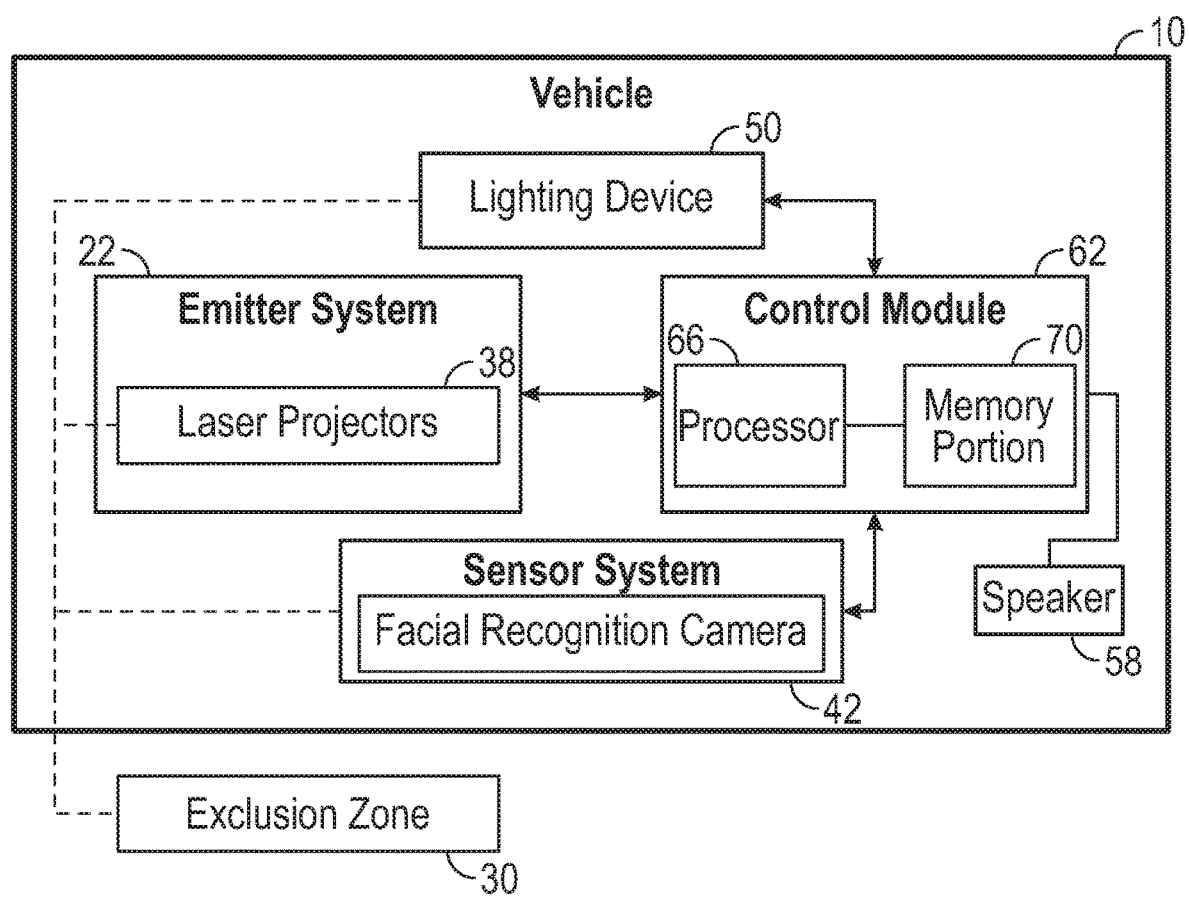
FIG. 3 illustrates a highly schematic view of the vehicle of FIG. 1.

With reference to FIGS. 1-3, a vehicle 10 is stationary (i.e., parked). The exemplary vehicle 10 is a law enforcement vehicle. Occupants can be within a passenger cabin 14 of the vehicle 10. Individuals 18 can be located outside the vehicle 10 at various distances from the vehicle 10.

The vehicle 10 includes an emitter system 22 that can selectively emit light to project a marker 26 adjacent the vehicle 10. The marker 26 can be visible on the ground surrounding the vehicle 10. In the exemplary embodiment, the marker 26 extends circumferentially continuously about a perimeter of the vehicle 10.

The marker 26 provides a visual representation of an exclusion zone 30 about the vehicle 10. The individuals 18 can see the marker 26 and understand boundaries of the exclusion zone 30. In some examples, the marker 26 could include characters, symbols, etc. that help the individuals understand that the exclusion zone 30 should not be entered. For example, the marker 26 could include the words: "CAUTION. KEEP OUT" displayed on the ground.

The occupants within the passenger cabin 14 can rely on the exclusion zone 30 to discourage the individuals 18 from approaching the vehicle 10 and to encourage the individuals 18 to stay outside the exclusion zone 30 a distance away from the vehicle 10.

In this exemplary embodiment, the emitter system 22 includes four individual laser projectors 38 mounted on top of the vehicle 10. The marker 26 is a laser projected line emitted from one or more of the laser projectors 38. In other examples, the marker 26 can be provided by light emitted from other types of light emitters.

The exemplary vehicle 10 further includes sensor system 42 that can detect the positions of the individuals 18 relative to the vehicle 10, the exclusion zone 30, or both. In particular, the sensor system 42 can detect whether or not one or more of the individuals 18 has crossed over the marker 26 and entered the exclusion zone 30.

In FIG. 1, the sensor system 42 can detect that the individual 18' has entered the exclusion zone 30. Based on information from the sensor system 42, the vehicle 10 can automatically respond when one or more individuals 18, such as the individual 18', has crossed the marker 26 and entered the exclusion zone 30.

The automatic response by the vehicle 10 can include automatically rolling up windows of the vehicle 10, locking doors of the vehicle 10, turning on cameras of the vehicle 10, or some combination of these. Images captured by the cameras can be viewed by an occupant within the passenger cabin 14 on a display screen of the vehicle 10. Knowing that the vehicle 10 will automatically respond to the individual 18' that has entered the exclusion zone 30 can help the occupants to feel more secure.

In the embodiment, the vehicle 10 includes at least one lighting device 50. The vehicle 10 uses the at least one lighting device 50 when automatically responding to the individual 18' entering the exclusion zone 30. As an exemplary response, the at least one lighting device 50 is adjusted to direct a beam of light 54 toward the individual 18', and, in some examples, into the eyes of the individual 18'.

The beam of light 54 can help the individual 18' understand that they are within the exclusion zone 30. Further, the beam of light 54 can impede vision of the individual 18'. In some examples, the lighting device 50 could flash the beam of light 54 on and off to further impede the vision of the individual 18'. The rate at which the beam of light is flashed could increase it the individual 18' continues to approach the vehicle 10, or accelerates toward the vehicle 10. Impeding the vision of the individual 18' can cause the individual 18' to slow their approach speed toward the vehicle 10, which can give the occupants within the vehicle 10 time to respond and react to the individual 18'.

In the exemplary embodiment, the lighting device 50 is separate from the emitter system 22 that provides the marker 26. In another example, the lighting device 50 could be part of the emitter system 22. For example, one or more of the laser projector 38 could be automatically adjusted in response to the individual 18' entering the exclusion zone 30 such that laser light is directed toward the individual 18'. In such an example, the beam of light 54 would be provided by the laser from the laser projector 38.

In some examples, the sensor system 42 can monitor a speed at which the individual 18' is entering the exclusion zone 30 and approaching the vehicle 10. The approach speed of the individual 18' may change the automatic adjustments by the lighting device 50. For example, if the individual 18' is running toward the vehicle 10, the lighting device 50 may provide a brighter beam of light 54, or may more quickly respond to the individual 18' entering the exclusion zone 30.

The at least one sensor system 42 can include at least one camera, which can be a facial recognition camera, a stereo camera, or both. Utilizing the camera as part of at least one sensor system 42 can enable the vehicle 10 to detect data about the individuals 18 proximate the exclusion zone 30 and, in particular, the individual 18' within the exclusion zone 30. A stereo camera, as is understood, can help to calculate a distance between the stereo camera and an object identified by the stereo camera. The stereo camera can also allow a more three-dimensional assessment when utilizing the facial recognition technologies, which can provide enhanced results.

Data from the at least one camera may reveal that the individual 18' is, for example, wearing a mask to conceal their face. In response to this data, the vehicle 10 may alter the rate at which the lighting device 50 adjusted to direct the beam of light 54 toward the individual 18'.

If the camera is a facial recognition camera, the vehicle 10 may utilize data captured by the camera to identify the individual 18' by name. The vehicle 10 could connect with a cloud-based system containing a database of facial recognition information enabling such an identification. The vehicle 10 could include the database of facial recognition information in other examples.

The vehicle 10 could include, for example, a database containing facial recognition information for individuals that are law enforcement's most wanted individuals within a particular geographic region.

The response by the vehicle 10 may be altered based on the facial recognition camera and comparison identifying the individual 18' entering the exclusion zone 30. In some examples, the vehicle 10 can include a speaker 58 that broadcasts a name of the individual 18' based on the identifying information captured by the facial recognition camera. Broadcasting the name of the individual 18' within the exclusion zone 30 may prompt the individual 18' to more quickly exit the exclusion zone 30.

In some embodiments, the facial recognition camera can record information used identify individuals 18 that are outside the exclusion zone 30, but near the marker 26. Identifying these individuals 18 can be helpful for investigative purposes. For example, if the vehicle 10 is at a crime scene, law enforcement may find it useful to identify individuals near the crime scene even if those individuals have not entered the exclusion zone 30.

The vehicle 10 can include a control module 62 that is utilized to control and coordinate the exemplary methods of emitting, monitoring, and sensing. The control module 62 can be part of larger module within the vehicle 10. The control module 62, in this example, includes a processor 66 operatively linked to a memory portion 70. The example processor 66 can be programmed to execute a program stored in the memory portion 70. The program may be stored in the memory portion 70 as software code. The program stored in the memory portion 70 may include one or more additional or separate programs, each of which includes an ordered list of executable instructions for implementing logical functions.

The processor 66 can be a custom made or commercially available processor, a central processing unit (CPU), an auxiliary processor among several processors associated with the control module 62, a semiconductor based microprocessor (in the form of a microchip or chip set) or generally any device for executing software instructions.

The memory portion 70 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 4:
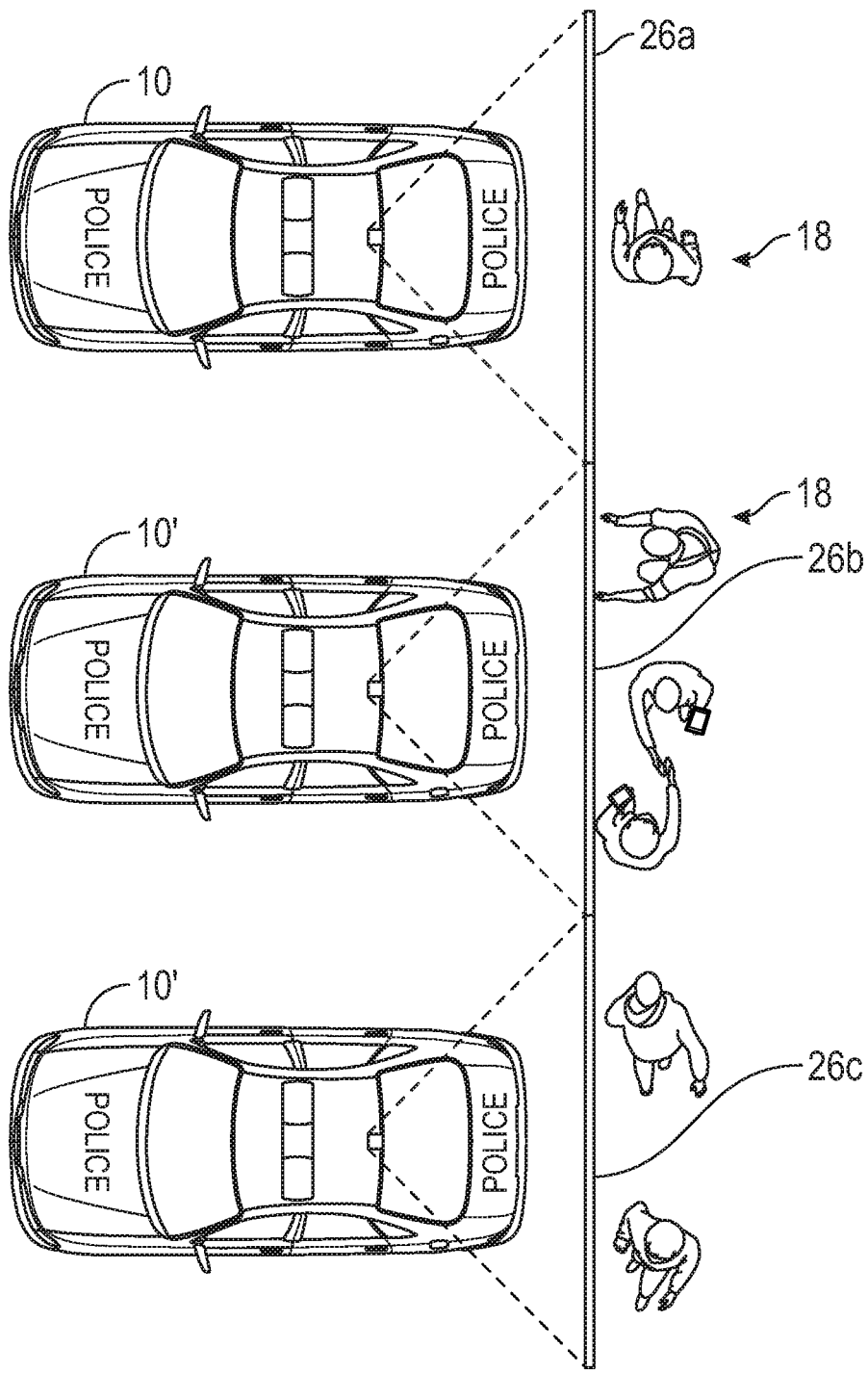
FIG. 4 illustrates a top view of the vehicle of FIG. 1 along with other vehicles that provide and monitor an exclusion zone.

In FIG. 1, the marker 26 is shown as a continuous line about a circumferential perimeter of the vehicle 10. In another example, the marker 26 could be a marker 26a like that shown in FIG. 4. The marker 26a does not extend about a periphery of the vehicle 10. The marker 26a is a straight line. The marker 26a can combine with markers 26b and 26c from other vehicles 10' to provide an extended marker.

The combined markers 26a-26c could be, for example, up to 50 feet away from the respective vehicle 10, 10'. The markers 26a-26c, individually and when combined, can assist with crowd control and provide a visual indication of a boundary that the individuals 18 should not cross.

The vehicles 10 and 10' could communicate via a Bluetooth Low Energy (BLE) communications, or another type of wireless communication, to coordinate placement of the emitted markers 26a-26c.

Speakers of the vehicles 10 and 10' can broadcast messages to the individuals 18, such as messages that notify the individuals 18 they will face arrest and search if they cross the markers 26a-26c toward the vehicles 10 and 10'. If one of individuals 18 crosses the markers 26a-26c, the speaker can broadcast that individual's name and can direct a spotlight on that individual.

While the exemplary embodiments depict the vehicles 10 and 10' as stationary, the vehicles 10 and 10' could be moving while the lighting device 50 is projecting the markers 26, 26a-26c. The vehicles 10 and 10' could also move while monitoring for individuals entering or within the exclusion zones 30. The vehicles 10 and 10' could also move while monitoring individuals outside the exclusion zones 30 (e.g., facial recognition, for example).

Figure 5:
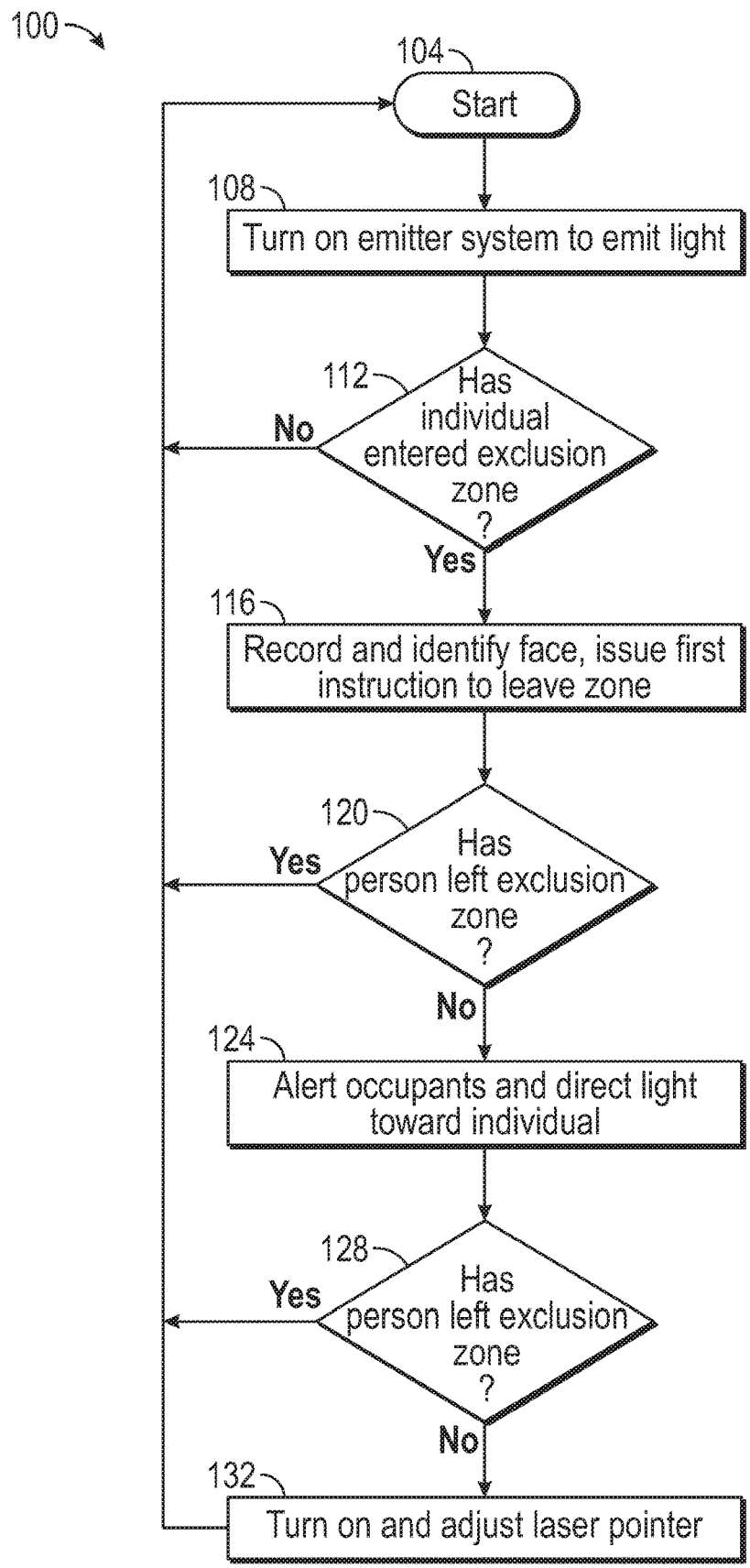
FIG. 5 illustrates the flow of an example exclusion zone providing and monitoring method.

With reference to FIG. 5, a flow of an exclusion zone monitoring method 100 according to an exemplary embodiment begins at a step 104. Next, at a step 108, an emitter system, such as one or more laser projectors on a vehicle, emits light to project a marker that represents a boundary of an exclusion zone. The positioning of the markers can be standardized or can be adjusted by, for example, an occupant within the vehicle utilizing an input device, such as a touchscreen interface.

At a step 112, the method 100 monitors to detect whether any individual has crossed the marker and entered the exclusion zone. In some examples, the method 100 may monitor to detect, specifically, if a face of the individual has entered the exclusion zone.

If no, the method 100 continues to monitor. If yes, the method 100 moves to a step 116, which records and identify the individual within the exclusion zone. The identifying could be accomplished using cameras and facial recognition technologies.

At the step 116, the vehicle can announce an audible message that instructs the individual to exit the exclusion zone. The announcement can include the name of the individual, if known.

The method 100 then moves to a step 120, which assesses whether or not the individual has left the exclusion zone. If yes, the method 100 continues to monitor. If no, the method 100 moves to a step 124, which alerts occupants of the vehicle to the individual, and automatically adjusts a lighting device to direct a beam of light toward the individual within the exclusion zone. The occupants can be law enforcement officers and the lighting device a spotlight of a police vehicle.

At a step 128, the method 100 then again assesses whether or not the individual has left the exclusion zone. If yes, the method 100 continues to monitor. If no, the method 100 moves to a step 132 where a laser pointer is turned on and automatically adjusted to direct a laser beam at the individual within the exclusion zone.

At any step in the method 100, facial features of individuals recorded by a camera, for example, can be stored, identified, checked against databases for warrants, etc. Additionally, variable wait times (based on distance, approach speed, results of wants/warrants check) could be used to give an individual with person time to respond to command.

In some examples, the vehicle can be operating in an autonomous (unoccupied) manner with the former passenger, such as a law enforcement officer, some distance away. If an individual enters the exclusion zone, the vehicle can automatically alert the officer and instruct the individual within the exclusion zone to remain where they are until officer arrives to resolve situation (ticket, arrest, etc.).

Some features of the exemplary embodiments can include utilizing, for example, an emitter system to provide a marker or visual boundary of an exclusion zone. The marker provides a visual representation of a "do not cross" line for crowd control.

A lighting device may automatically be automatically repositioned in response to an individual entering the exclusion zone. The lighting device repositioning may include adjusting a laser projector to direct lasers toward the individual within the exclusion zone.

The vehicle can automatically respond to the individual within the exclusion zone in various ways. The responses by the vehicle can be based on a distance that the individual is from the vehicle, a rate of movement of the individual, or an identity of the individual. The identity can be determined using, for example, facial recognition technologies.

In addition to collecting an identity of an individual within the exclusion zone utilizing facial recognition technology, the vehicle can further collect identity information for individuals near the exclusion zone. Further, the vehicle could record/identify cellular signals and Bluetooth low energy signals for individuals within the exclusion zone and nearby the exclusion zone.

In addition to redirecting the lighting device automatically, the vehicle may issue audible commands. Some of the commands may be targeted to an individual within the exclusion zone. If the identity of the individual is known, the commands can include identifying the individual by name. The exemplary embodiments can dissuade individuals from entering an exclusion zone near a vehicle and is particularly useful for law enforcement vehicles and crowd control vehicles.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   an emitter system of a vehicle, the emitter system configured to project a marker to provide a visual representation of an exclusion zone adjacent the vehicle;
   a sensor system of the vehicle, the sensor system configured to detect a position of an individual relative to the exclusion zone; and
   at least one lighting device of the vehicle, the vehicle configured to redirect light from the at least one lighting device based on the position of the individual relative to the exclusion zone.

2. The vehicle assembly of claim 1, wherein the vehicle is configured to redirect light from the at least one lighting device into a face of the individual based on the position of the individual relative to the exclusion zone.

3. The vehicle assembly of claim 1, wherein the vehicle is configured to redirect light from the at least one lighting device in response to the individual entering the exclusion zone.

4. The vehicle assembly of claim 1, wherein the emitter system comprises a laser projector and the marker is provided by at least one laser beam emitted from the laser projector, wherein the marker includes at least one word.

5. The vehicle assembly of claim 1, wherein the at least one lighting device comprises a spotlight that is configured to move to redirect light based on the position of the individual relative to the exclusion zone.

6. The vehicle assembly of claim 1, wherein the sensor system is configured to capture details that can identify the individual.

7. The vehicle assembly of claim 6, wherein the sensor system comprises a facial recognition camera.

8. The vehicle assembly of claim 6, wherein the sensor system comprises a stereo camera.

9. The vehicle assembly of claim 6, further comprising a speaker of the vehicle, the speaker configured to broadcast identification details about the individual based on the position of the individual relative to the exclusion zone.

10. The vehicle assembly of claim 9, wherein the identification details include a name of the individual.

11. A monitoring method, comprising:
    projecting a marker from an emitter system of a vehicle, the marker providing a visual representation of an exclusion zone adjacent the vehicle;
    detecting a position of an individual relative to the exclusion zone; and
    redirecting light from at least one lighting device on the vehicle, the redirecting based on the position of the individual relative to the exclusion zone.

12. The monitoring method of claim 11, wherein the redirecting includes redirecting light from the at least one lighting device into a face of the individual when the individual is within the exclusion zone.

13. The monitoring method of claim 11, further comprising automatically capturing details about the individual when the individual is in the exclusion zone and using the details to identify the individual.

14. The monitoring method of claim 13, further comprising audibly broadcasting an identity of the individual when the individual is in the exclusion zone.

15. The monitoring method of claim 11, wherein the projecting includes emitting a laser from a laser projector of the vehicle, wherein the marker projected by the laser includes at least one alphanumeric character.

16. The monitoring method of claim 15, wherein redirecting light from at least one lighting device on the vehicle includes redirecting the laser from the laser projector.

17. The monitoring method of claim 11, wherein redirecting light from at least one lighting device on the vehicle includes flashing the light from the lighting device on and off.

18. The monitoring method of claim 11, further comprising changing a brightness of light emitted from the at least one lighting device on the vehicle based on a speed at which the individual is approaching the vehicle.

19. The monitoring method of claim 11, further comprising redirecting by moving the least one lighting device.

20. A monitoring method, comprising:
    projecting a marker from an emitter system of a vehicle, the marker providing a visual representation of an exclusion zone adjacent the vehicle;
    detecting a position of an individual relative to the exclusion zone; and
    redirecting light from at least one lighting device on the vehicle, the redirecting based on the position of the individual relative to the exclusion zone,
    wherein the individual is a first individual, and further comprising automatically capturing details about a second individual that is outside the exclusion zone and using the details to identify the second individual.

* * * * *